United States Patent [19] | [11] 4,056,647
Garrick et al. | [45] Nov. 1, 1977

[54] POWDER EDGE COATING FOR CEILING TILE

[75] Inventors: John R. Garrick; Ray C. Kendig, both of Lancaster, Pa.

[73] Assignee: Armstrong Cork Company, Lancaster, Pa.

[21] Appl. No.: 644,646

[22] Filed: Dec. 29, 1975

[51] Int. Cl.² .......................... B32B 3/10; B32B 3/02; B05D 1/12

[52] U.S. Cl. .................................... 428/134; 52/144; 427/180; 427/197; 427/284; 427/286; 428/192; 428/194

[58] Field of Search ............... 427/180, 197, 284, 285, 427/286, 428, 439, 440; 428/192, 193; 52/144, 145; 181/33 G, 33 GA

[56] References Cited

U.S. PATENT DOCUMENTS

| | | | |
|---|---|---|---|
| 2,717,538 | 9/1955 | Alexander | 92/39 |
| 2,802,764 | 8/1957 | Slayter et al. | 181/33 GA |
| 2,825,420 | 3/1958 | Heine | 52/144 X |
| 2,995,198 | 8/1961 | Green | 181/33 G |
| 3,013,626 | 12/1961 | Brown et al. | 181/33 G |
| 3,015,626 | 1/1962 | Kingsbury | 181/33 GA |
| 3,077,945 | 2/1963 | Thomas et al. | 181/33 GA |
| 3,095,347 | 6/1963 | Becker | 181/33 GA |
| 3,357,516 | 12/1967 | Cadotte et al. | 181/33 GA |
| 3,470,977 | 10/1969 | Shannon | 52/144 X |
| 3,640,787 | 2/1972 | Heller | 181/33 GA |

FOREIGN PATENT DOCUMENTS

| | | | |
|---|---|---|---|
| 823,057 | 11/1959 | United Kingdom | 427/180 |
| 1,209,048 | 10/1970 | United Kingdom | 427/180 |

*Primary Examiner*—Harry J. Gwinnell
*Assistant Examiner*—Shrive P. Beck

[57] ABSTRACT

The edge of a ceiling tile adjacent the fissured or embossed face of the ceiling tile is provided with a powder coating. The ceiling tile is formed from a fibrous board which has an open pore structure, and powder is dusted on the edge of the ceiling tile and is mechanically held in the open pore structure of the ceiling tile. The powder coating covers the upper edge of the ceiling tile with a coating so as to eliminate the dark edge effect secured when two ceiling tiles are in position with their front planar surfaces not quite in the same plane.

4 Claims, 2 Drawing Figures

POWDER EDGE COATING FOR CEILING TILE

BACKGROUND OF THE INVENTION

1. Field of the Invention

The invention is directed to a ceiling tile and, more particularly, to a cosmetic coating for the edge of the ceiling tile.

2. Description of the Prior Art

U.S. Pat. No. 3,357,516 teaches the applying of an adhesive and then a powder to a ceiling board to provide it with a colored coating.

U.S. Pat. No. 3,632,372 teaches the use of a powder coating on a wood product with the use of heat and pressure to fuse the powder.

U.S. Pat. No. 2,677,622 teaches the use of a powder coating on a fabric with the use of an ironing roll to fuse the powder.

U.S. Pat. Nos. 3,013,626, 2,995,198 and 2,717,538 show fissured ceiling tile.

Finally, U.S. Pat. Nos. 2,758,564 and 2,648,466 show examples of powder dispensing devices for applying a dry dust powder.

SUMMARY OF THE INVENTION

The edges of a ceiling tile adjacent the face of the ceiling tile are coated with a colored or white powdered material to camouflage these edges and reduce the visual effect of edge misalignments or nonpattern matching of an irregular pattern where the embossed effect of the irregular pattern continues across the edges of adjacent ceiling tiles.

A powder spray gun nozzle is placed in close proximity to the edge of the ceiling tile and powder is blown onto the edge of the ceiling tile. Because the ceiling tile is made of a fibrous board structure having an open pore surface, the powder is held in place by mechanical entrapment in the open pore structure of the board. The total edge of the ceiling board need not be coated, but only that portion of the upper edge of the ceiling tile which is adjacent the face of the ceiling tile.

DESCRIPTION OF THE PREFERRED EMBODIMENT

Figure 1:
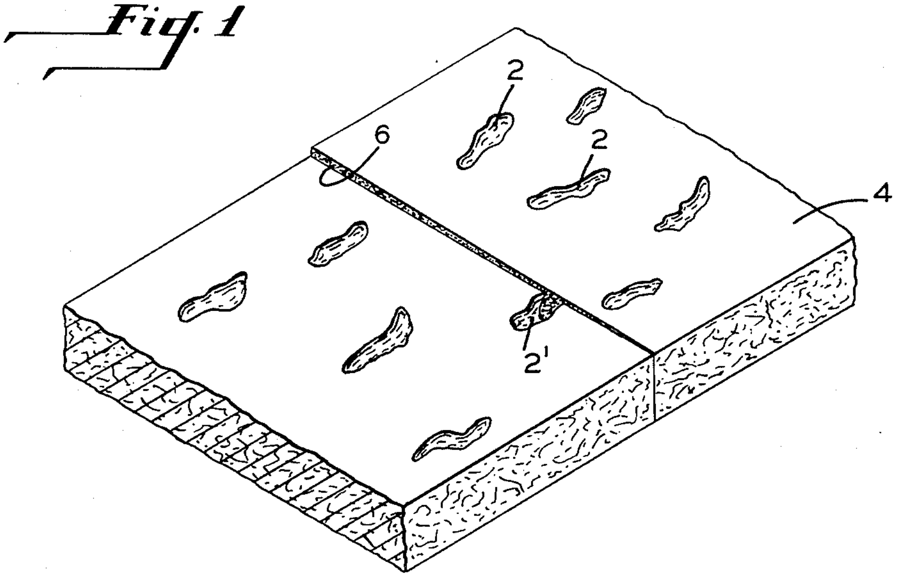
FIG. 1 is a showing of two misaligned non-edge coated ceiling tile.

The invention herein is primarily designed to be utilized with tongue and groove 12 inches × 12 inches ceiling tiles made in the manner described in either one of U.S. Pat. Nos. 3,013,626, 2,995,198, or 2,717,538. The products disclosed therein are basically mineral wool products. The invention could equally well be used with ceiling tiles made from cellulosic material. Also, the invention could equally well be used with ceiling boards as utilized in a concealed type of ceiling suspension system wherein the ceiling boards are butted up against each other to form a concealed joint with the suspension system located behind the plane of the ceiling board face.

In one specific embodiment in the invention, the body of the ceiling tile may be made from mineral wool fibers joined into an open porous product by a binder such as starch and including a mineral filler. A typical formula is as follows, all parts being given by weight on a dry, solid basis:

| Ingredients | Parts by Weight |
|---|---|
| Mineral fibers | 960.00 |
| Amylaceous binder material, e.g. pearl starch and beater flour | 165.0 |
| Refined or repulped wood fiber | 7.0 |
| Wax size | 13.0 |
| Finely divided filler material | 480.0 |

In the preparation of the material, the pearl starch may be mixed with water and heated to about 190° F. to gel the starch. The finely divided filler material, the beater flour and the wax size may then be formed into a slurry and added to the gelled pearl starch mix. The wood fiber, diluted to the desired extent for convenient handling, may then be incorporated with the other components and sufficient water added to provide a total batch of 960 gallons. To this batch is added 960 pounds of mineral wool or other nodulated mineral fiber material, such as glass wool, or a mixture of both mineral wool and glass wool. This slurry is agitated to coat the fibers making up the nodules and the product is then delivered to a conventional forming machine such as a conventional Fourdrinier paper forming wire to produce a mat of the desired thickness for subsequent fabrication into a product of the desired dimensions, e.g. 12 inches × 12 inches × 13/16 inch thick. While the preferred binder consists essentially of amylaceous material, other binder ingredients may be employed. The finely divided filler material preferably is clay and the finely divided residue resulting from sawing, sanding, and other fabrication operations on the finished product of previous runs. The wood fiber is preferably hydrated to a freeness of 10 or less and has a permanganate number of 24 or less.

Drying of the board is accomplished by passing it, as delivered from the forming machine, through a heated oven. The mat is heated to about 190° F. (88° C.) in a humid atmosphere to convert the binder and then further heated to remove water and finally activate the binder. A temperature of 220° to 230° F. (105° to 110° C.) in the board is a good maximum to observe, it being recognized, of course, that the oven itself will be heated to a temperature well in excess of this in a portion of the heating zone. The product may be provided with fissures 2 by either the method of the Alexander U.S. Pat. No. 2,717,538, or preferably by the method of the Brown et al U.S. Pat. No. 3,013,626.

The finished product, after drying, is quite open and porous and contains a multitude of interconnecting pores which extend between and among the fibers and terminate as openings at the surface of the board. With a product formed from mineral wool, many of the openings are of microscopic size and are not visible; others are much larger, depending upon the nature of the fibers, irregular entanglement of the fibers into clumps of varying sizes, etc.

The product is often sanded, particularly on its finished surface and provided with normally a white paint coat. Fissures or a surface texturing are provided, as indicated above, by conventional techniques, and particularly that of the Brown et al U.S. Pat. No. 3,013,626. Normally, the edges of the ceiling tile which are generally perpendicular to the finished surface 4 containing the fissures 2 are not provided with a paint coating, and these edges are the color of the natural board product.

This coloring is normally a grey shade with a mineral wool fiber and a yellow-tan shade with a cellulosic fiber material.

Referring now to FIG. 1, when two edges of the tile are placed in a side-by-side relationship, it often happens that a fissure 2' on one tile extends to the edge of the tile and there is not a corresponding fissure at the same point on the edge of the adjacent tile. Consequently, the edge of the second tile is clearly visible when one looks into the fissure 2' in the direction of the adjacent tile. It is also possible that two tiles could be in position with the plane of one tile not being exactly in the plane of the adjacent tile, thus providing a raised shoulder 6 where one tile butts up against the second tile. As indicated above, it is possible that the tiles could be provided with conventional tongue and groove configurations or they could be mounted with the conventional concealed suspension system. In either case, the finished surface 4 of two adjacent ceiling tiles or boards are placed in the same plane and their edges abut each other with both faces of the ceiling tiles in the same plane.

Because the edges of the ceiling tile are not finished, any misalignment of the fissured design or the planar surfaces of the ceiling tiles will have this misalignment emphasized due to the color difference between the face of the ceiling tile and the edge of the ceiling tile.

Figure 2:
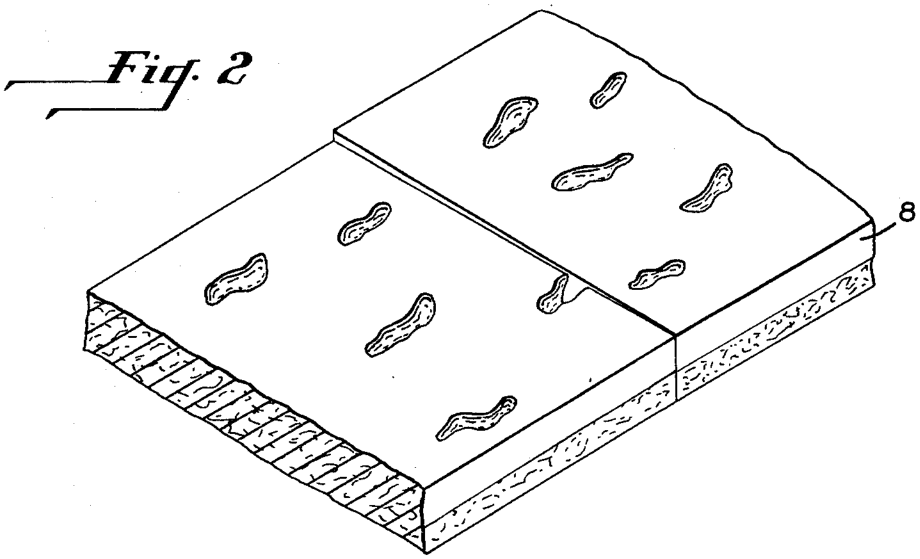
FIG. 2 is a showing of two coated misaligned ceiling tile.

Painting of the edges of the ceiling tiles, in the same manner as the face of the ceiling tiles are painted, is not a desirable commercial solution. The edges of the tile are undesirably stiffened by painting, and the edges of the ceiling tile, due to the nature of the technique for forming the board, tend to be more porous than the face of the board and, therefore, more paint per unit area would be needed to provide the edges with a good paint coat. The method herein provides a technique for coloring the important portions of the edge of a ceiling board to lessen the visual impact of an exposed edge. FIG. 2 is a showing of a ceiling board wherein a portion of the edge of the ceiling board has been coated with a dry powder 8. With the edge of the ceiling board now basically the same color as the face of the ceiling board, misalignment of the edges of adjacent ceiling tiles or the exposure of the edge of a ceiling tile in the fissure of an adjacent ceiling tile is substantially lessened due to the uniformity of color between the face and the edge of the ceiling tile.

Approximately the upper 50% of the edge of the ceiling board or tile will be coated with a dry powder. Coating of the lower 50% or area of the edge deeper than fissure depth of the ceiling board simply involves utilization of a color coating which is never exposed with a subsequent waste of coating material. Only that proportion of the edge of the ceiling board adjacent the face of the ceiling board and possibly exposed to view in the ceiling need be coated to provide a cosmetic edge to the ceiling board. A powder, such as titanium dioxide, calcium carbonate or talc, may be used to provide the edge of the board with a white coating. If it were desirable to provide the edge of the board with a color coating, then any type of colored powdered material could be utilized to provide the appropriate color coating. Coating is carried out by spraying a powder of 200–325 mesh size on the edge of the ceiling board. Because of the porous nature of the edge of the ceiling board, the powder will adhere to the edge of the ceiling board simply by mechanical entrapment of the powder in the pores of the ceiling board. Any excess powder may be removed by a vacuum exhaust operation. Not only does a powder coating provide for the appropriate color coating, but it does not tend to build up to any great thickness such as one would secure with a paint coating. Furthermore, the powder coating's lack of a hard crust makes the tile edges easier to fit together.

The powder coating may be applied by apparatus such as that disclosed in U.S. Pat. Nos. 2,648,466 or 2,758,564. Specifically, U.S. Pat. No. 2,758,564 discloses a structure in FIG. 1 which would be particularly adaptable for spraying the edge of ceiling boards. The nozzles 51 and 52 could be directed against the upper edge of ceiling boards as they are being conveyed upon a conveyor structure past the nozzles 51 and 52. As the board passes by the nozzles, the powder could be blown on the upper edge of the ceiling tiles or boards and any excess powder exhausted by an appropriate vacuum means.

What is claimed is:

1. In a method of producing a ceiling board product comprising a body formed of a fibrous mass bound together by appropriate binder means, the front surface of the board having applied to it a decorative coating of a given color and the edge surfaces of said ceiling board having an open porous surface, the improvement consisting of applying to a portion of said edge surface of the ceiling board a coating consisting of a dry powder, said powder being applied in a quantity and color so as to render said edges basically the same color as the decorative color of the front face surface, said powder being adhered to the edges of the ceiling board only by mechanical entrapment of the powder in the pores of the edges of the ceiling board.

2. The ceiling board made according to the process of claim 1.

3. The ceiling board of claim 2 wherein the front surface of the ceiling board is provided with a surface texturing that, at some point, extends to the edge of the front surface of the ceiling board and is designed to continue on to an adjacent board.

4. The ceiling board of claim 2 wherein the powder coating is provided only on the upper edge of the board adjacent the front of the board.

* * * * *